(12) United States Patent
Prince et al.

(10) Patent No.: US 8,267,461 B2
(45) Date of Patent: Sep. 18, 2012

(54) TENSION BOW LOCKING DEVICE FOR A FLEXIBLE COVER SYSTEM

(75) Inventors: Donald Prince, Franklin, IN (US); Ronald A. Wehnert, Indianapolis, IN (US); John Vogel, Columbus, IN (US); Ronald L. Eggers, Fremont, NE (US); Ryan Reeder, Carmel, IN (US)

(73) Assignee: Aero Industries, Inc., Indianapolis, IN (US)

( * ) Notice: Subject to any disclaimer, the term of this patent is extended or adjusted under 35 U.S.C. 154(b) by 0 days.

(21) Appl. No.: 13/099,870

(22) Filed: May 3, 2011

(65) Prior Publication Data

US 2011/0266826 A1 Nov. 3, 2011

Related U.S. Application Data

(60) Provisional application No. 61/330,425, filed on May 3, 2010.

(51) Int. Cl.
*B60P 7/04* (2006.01)

(52) U.S. Cl. ............... 296/100.14; 296/98; 296/120.1

(58) Field of Classification Search ............ 296/98, 296/100.14, 120.1, 56, 106, 57.1; 135/144; 403/83–85
See application file for complete search history.

(56) References Cited

U.S. PATENT DOCUMENTS

| 1,748,031 | A | * | 2/1930 | Wiener et al. ............ 296/98 |
| 4,634,158 | A | * | 1/1987 | Jones ................... 292/260 |
| 5,031,955 | A | | 7/1991 | Searfoss |
| RE36,135 | E | * | 3/1999 | O'Brian ................. 296/98 |
| 6,273,490 | B1 | * | 8/2001 | Haddad, Jr. .......... 296/100.01 |
| 6,338,521 | B1 | | 1/2002 | Henning |
| 2009/0167049 | A1 | * | 7/2009 | Lariviere .............. 296/98 |

* cited by examiner

*Primary Examiner* — Dennis Pedder
(74) *Attorney, Agent, or Firm* — Maginot, Moore & Beck, LLP

(57) ABSTRACT

A cover system for covering an open top of an open-topped container with a flexible cover comprises a bail member having a first end pivotally connected to the container and an opposite second end connected to an end of the flexible cover, a tensioning bow member including an end portion pivotally connected to the bail member and an opposite end configured for bearing against the flexible cover, and a mechanism between the bail member and tensioning bow member including first and second members configured to cooperate to lock the tensioning bow member against movement relative to the bail member.

7 Claims, 13 Drawing Sheets

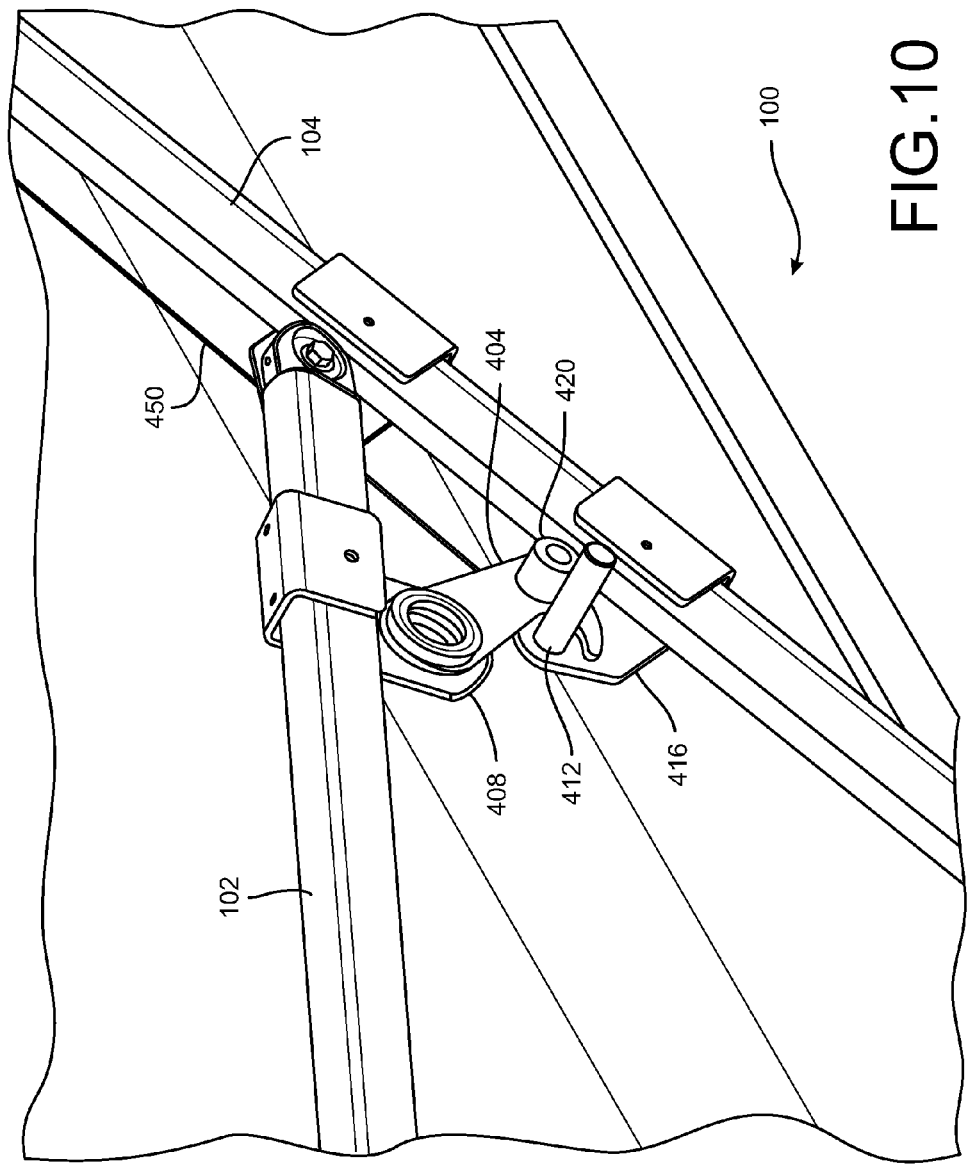

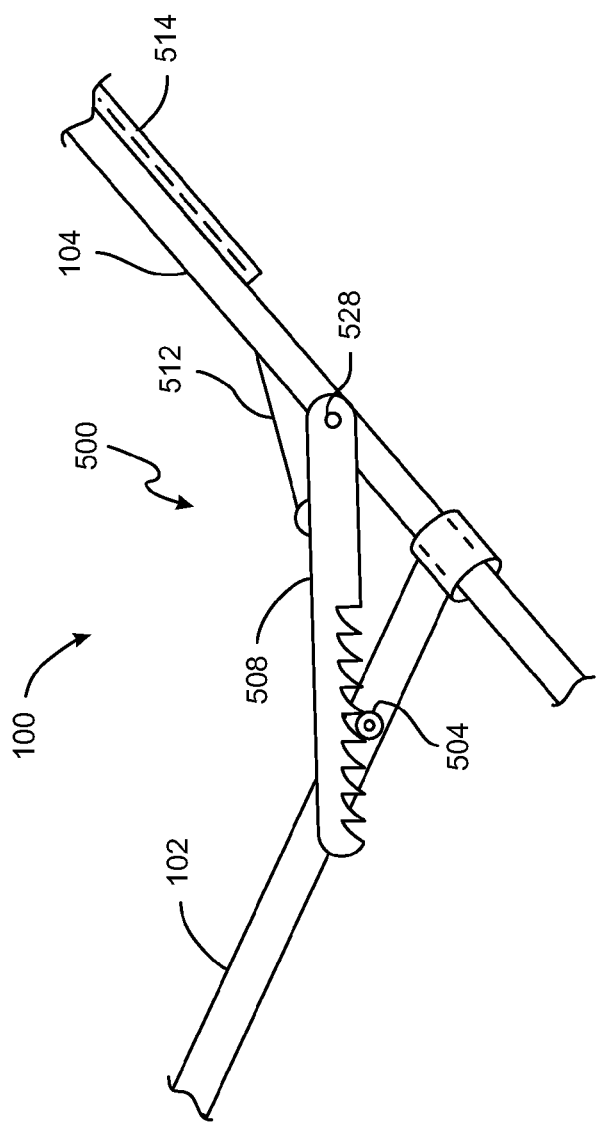
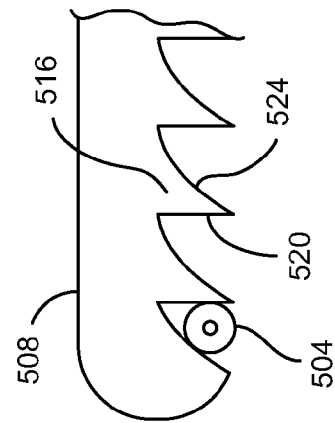

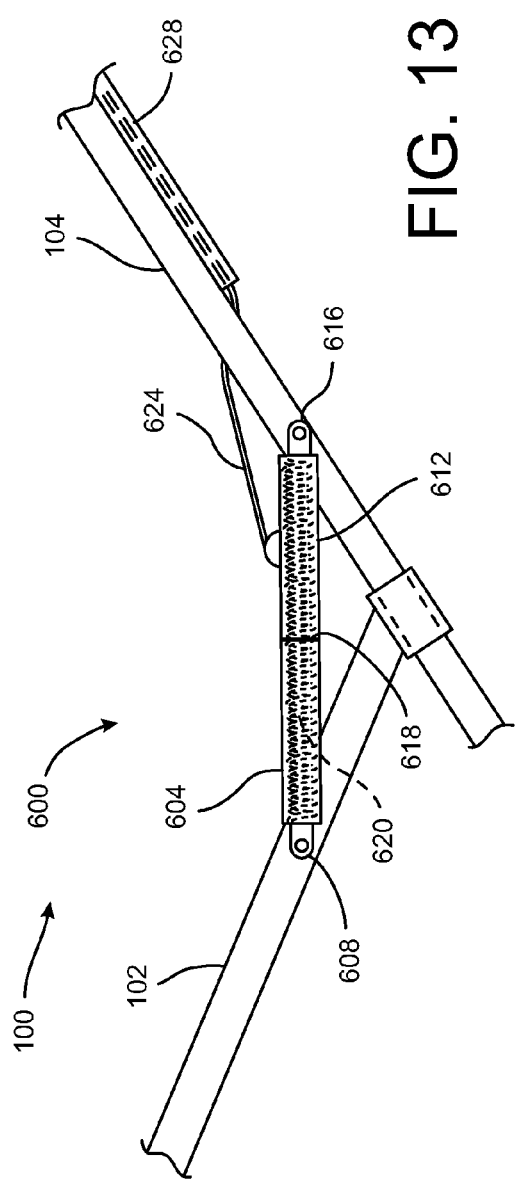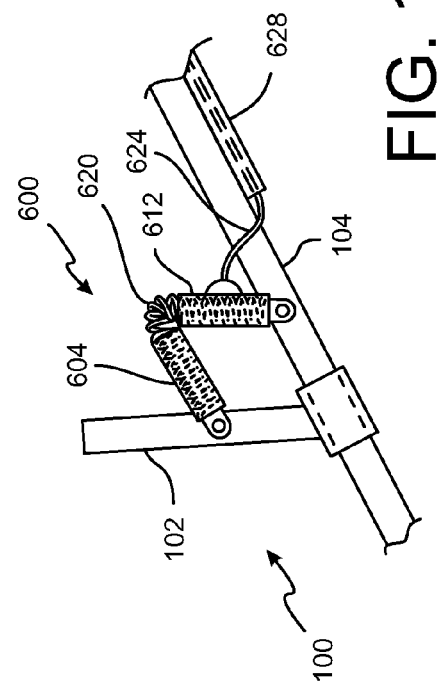

TENSION BOW LOCKING DEVICE FOR A FLEXIBLE COVER SYSTEM

This application is a utility application claiming priority to U.S. provisional patent application Ser. No. 61/330,425, filed May 3, 2010, entitled "Tensioning bow member Locking Device For A Flexible Cover System," the disclosure of which is incorporated by reference herein in its entirety.

BACKGROUND

The present disclosure relates to flexible covers or tarping systems for open-topped containers and particularly concerns a mechanism for restraining the flexible cover or tarp against the container.

Many hauling vehicles, such as dump trucks, include open-topped containers used for hauling or storing various materials. In a typical dump truck application, the open-topped container is referred to as the "dump body" of the truck. The dump body is used to haul a variety of load material, such as gravel and the like, as well as organic materials, such as grain or produce. Upon reaching the dumping site, the dump truck tilts the dump body to evacuate the load material from the dump body.

Depending upon the nature of the load material stored in the open-topped container, it is often desirable to provide a cover for the container. A cover is particularly valuable for covering the dump body of a dump truck when dump truck is in transit. Rigid covers are well known that may be hinged from one end of the container body and pivoted from an open to a closed position. While rigid covers may be acceptable for stationary containers, the same is usually not true for containers associated with land-traversing vehicles. Accordingly, rigid covers have given way to flexible cover systems.

Flexible cover systems utilize a flexible tarpaulin that can be drawn from a stowed position at one end of the container, to a deployed position covering the open top of the container. The flexible tarpaulin is preferable for dump trucks, because it can be easily stowed when the cover is not needed, such as during times when the dump body is being loaded and emptied. In addition, flexible cover systems are generally easier to deploy than rigid covers.

A variety of flexible cover systems have been developed that are geared toward particular hauling vehicle applications. One such tarping system is the Easy Cover® Tarping System manufactured and sold by Aero Industries, Inc. An example of one form of the Easy Cover® Tarping System is shown in FIG. 1. The system includes a U-shaped bail member 22 that is connected at a pivot mount 25 to the base of the container body 13 on the vehicle 10. A horizontal section 27 of the bail member 22 is attached to the tarp 16. The system also includes a U-shaped tensioning bow member 30 that is connected at a pivot mount 32 to the bail member 22. The tarp 16 is positioned between a horizontal section 34 of the tensioning bow member 30 and the container body 13. The tarp 16 can be preferably stowed by winding onto a tarp roller 19 at the forward end of the vehicle, which causes the tarp to slide under the horizontal section 34 of the tensioning bow member 30 as the bail member 22 pivots toward the front of the container body 13.

The system includes a variety of configurations that permit manual or powered deployment of the tarp over the open top of the container. In one typical installation, the pivot mount 25 includes a torsion spring pack that is biased to rotate the bail member 22 in a clockwise direction, as shown in FIG. 1, to pull the tarp 16 over the top of the container 13. The tarp roller 19 is biased to resist this rotation of the bail member 22. In some versions, a manual crank rotates the tarp roller 19 to allow the tarp 16 to unfurl under the torsion force of the spring pack. In other versions, a motor controls the rotation of the tarp roller. The manual crank or motor are rotated in the opposite direction to pull the bail member 22 toward the front of the container body 13 and to thereby stow the tarp 16.

One problem that is faced with tarping systems of the type shown in FIG. 1 is the effect of airflow or wind on the tarping system as the vehicle is traveling. In particular, the tarpaulin 16 is affected in a number of ways by the airflow associated with the traveling vehicle. This problem becomes especially acute at high speeds. In particular, the front end of the vehicle creates turbulent airflow that travels along the length of the container body 13. The turbulence, which can be manifested by air vortices along the top of the container body 13, has a tendency to lift the flexible cover 16 away from the top of the body.

Another problem facing the above-described tarping system is road vibration and shock, which can cause the bail member 22 and the tensioning bow member 30 to bounce on the container body 13 when the tarp 16 is deployed. This problem is especially noticeable for systems including the tensioning bow member 30, the position of which is maintained by only the weight of the tensioning bow member 30.

Movement of the tarp 16, the bail member 22, and the tensioning bow member 30 due to wind and vibration may have a deleterious effect is on the flexible cover system. The constant flapping and bouncing can gradually wear the tarp and the cover system components, which decreases the longevity of the cover system. In addition, when the tarp 16 is dislodged from its deployed position, the contents of the container body 13 are at risk of expulsion.

In order to address this problem, various systems have been devised to bias the tarp against the container body. In one common cover system, a web of cords is deployed over the tarp 16 along the length of the container body 13. The ends of the cords can be attached to mounts affixed to the side of the body 13. Whereas other cover systems rely on a complicated array of mechanical, electrical, and/or hydraulic structures to apply a constant tension along the length of the tarp 16. In most cases, however, these cover systems do not adequately restrain the bail/bow members 22, 30 or the tarp 16.

The prior approaches to maintaining the tarp against the container body either require manual intervention or sophisticated powered components. Accordingly, there remains a need for a tarping system having a tensioning bow member 30, which is less prone to the wind and vibrations associated with a moving container.

SUMMARY

In one aspect, a cover system is provided for covering an open top of an open-topped container with a flexible cover, the flexible cover having one end connected to the container, and the flexible cover sized to substantially cover the open top when an opposite end of the flexible cover is moved to an extended position. The cover system comprises a bail member having a first end pivotally connected to the container and an opposite second end connected to the opposite end of the flexible cover. The bail member is configured for movement from a stowed position to a deployed position in which the flexible cover is in the extended position. The cover system further includes a tensioning bow member including an end portion pivotally connected to the bail member and an opposite end configured for bearing against the flexible cover between the ends thereof. In one feature, the system includes a mechanism including a first member connected between the bail member and the tensioning bow member and a second member connected between the bail member and the tensioning bow member. The first and the second member are configured to cooperate in a predetermined position relative to each other to lock the tensioning bow member against movement relative to the bail member.

In one aspect, the mechanism includes a locking element to lock the first and second members in the predetermined position. In one embodiment, the locking element includes a magnetic engagement, while in another embodiment the locking element includes a friction engagement. In another aspect, the mechanism includes a hook and post arrangement that may incorporate a release mechanism. In still another aspect, the mechanism may include a ratchet and a lock pin configured to engage the ratchet. In another embodiment, the mechanism includes two tubes pivotally connected to each other and to the bail member and tensioning bow member, with a tension spring extending through the tubes and connected to the bail member and tensioning bow member. A release mechanism may be provided to dislodge one of the tubes from the predetermined position to release the lock between the bail member and the tensioning bow member.

In another embodiment, the tensioning bow member is connected to the bail member by a torsion spring. The torsion spring is configured to bias the free end of the tensioning bow member away from the free end of the bail member, to thereby apply tension or hold-down pressure to the cover.

BRIEF DESCRIPTION OF THE FIGURES

FIG. 10 is a close up perspective view of a locking mechanism that may be used in conjunction with the hold-down portion of the flexible cover system of FIG. 7.

FIG. 11 is a side view of another embodiment of a hold-down portion of a flexible cover system for use with the hauling vehicle of FIG. 1.

FIG. 12 is another side view of the hold-down portion of the flexible cover system of FIG. 11.

FIG. 13 is a side view of another embodiment of a hold-down portion of a flexible cover system for use with the hauling vehicle of FIG. 1.

FIG. 14 is another side view of the hold-down portion of the flexible cover system of FIG. 13.

DESCRIPTION OF THE PREFERRED EMBODIMENTS

Figure 1:
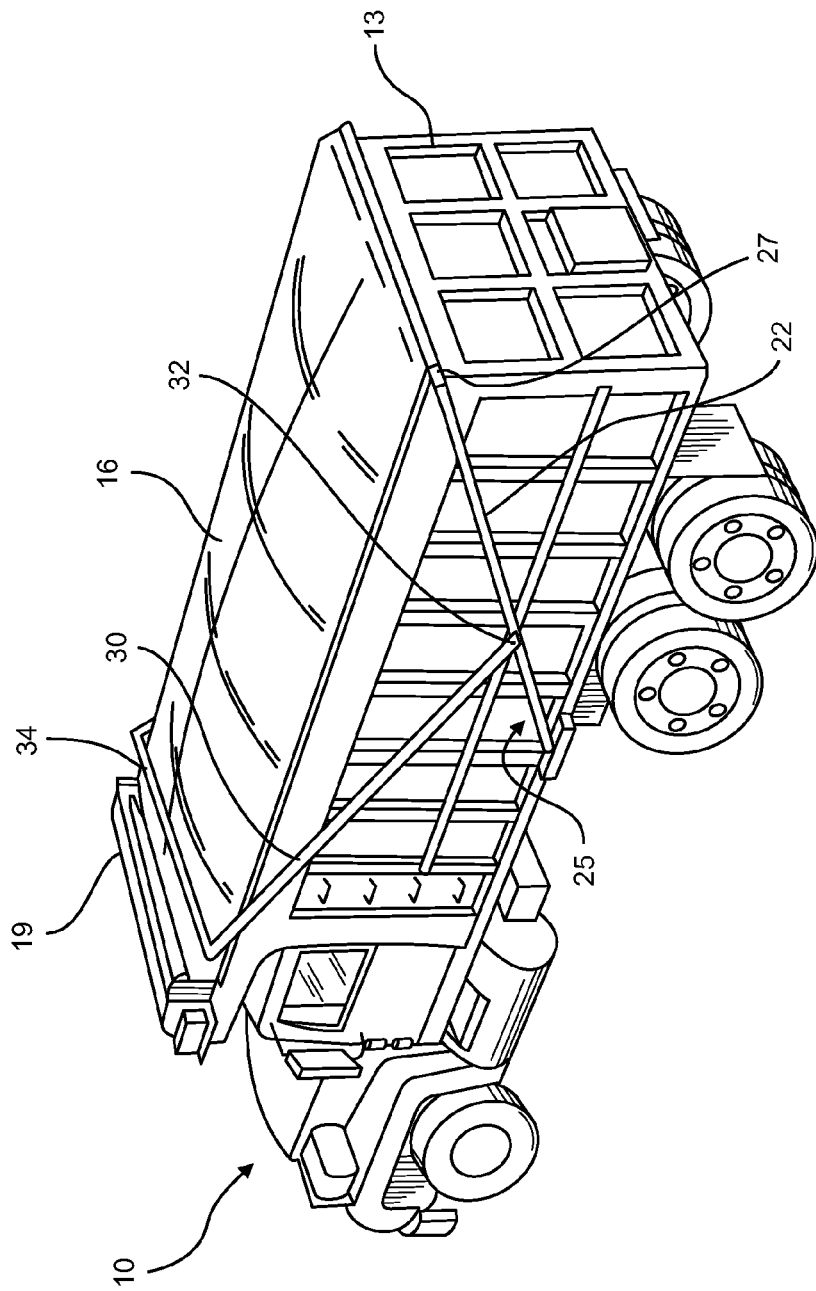
FIG. 1 is a top perspective view of a hauling vehicle utilizing a flexible cover system.

For the purpose of promoting an understanding of the principles of the disclosure, reference will now be made to the embodiments illustrated in the drawings and specific language will be used to describe the same. It should nevertheless be understood that no limitation of the scope of the disclosure is thereby intended. The disclosure includes any alterations and further modifications in the illustrated devices and described methods and further applications of the principles of the disclosure that would normally occur to one skilled in the art to which the disclosure relates. In the drawings, like reference numerals have been used throughout to designate like elements.

Figure 2:
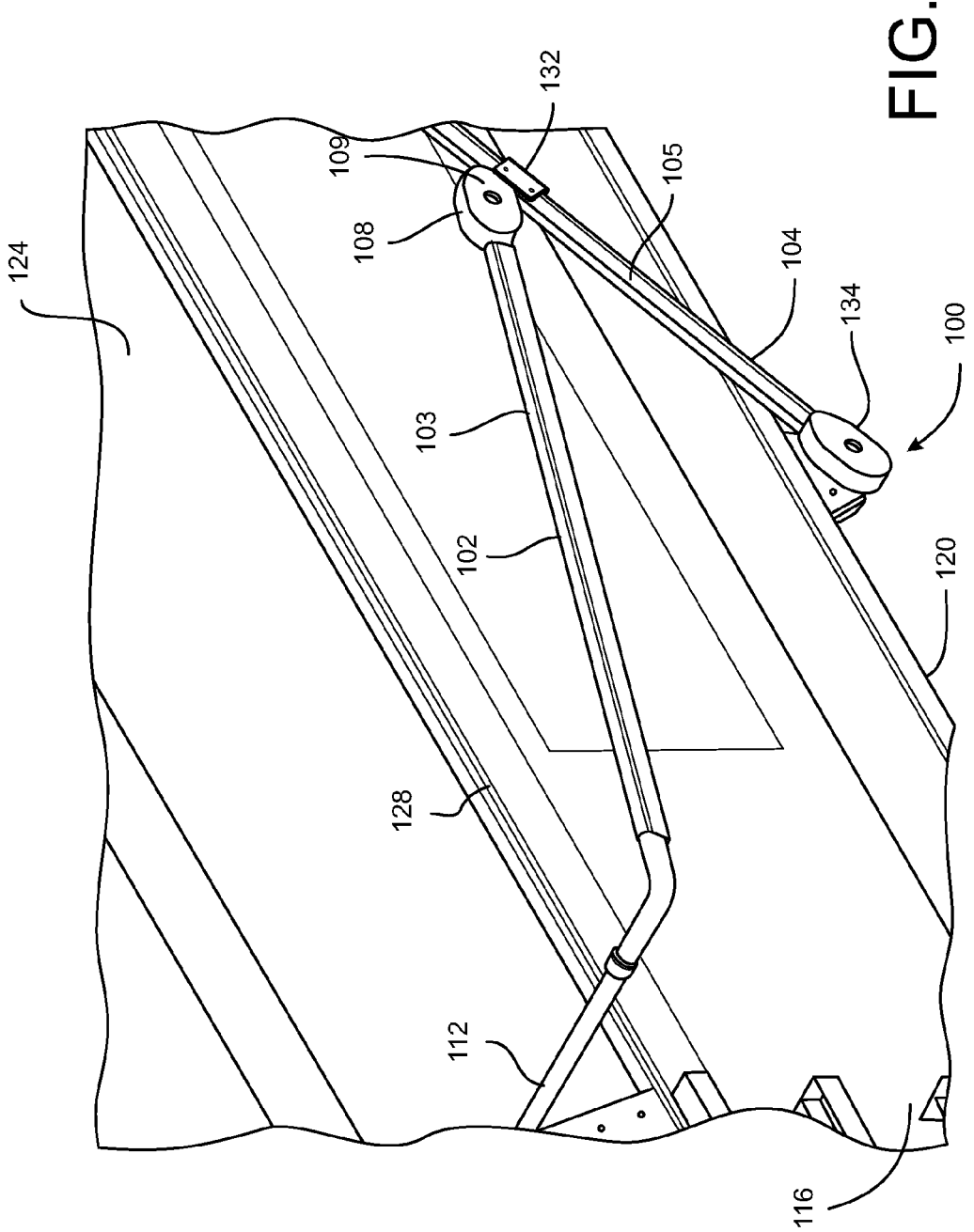
FIG. 2 is a perspective view of a hold-down portion of a flexible cover system for use with the hauling vehicle of FIG. 1, according to one embodiment of the present disclosure.
Figure 5:
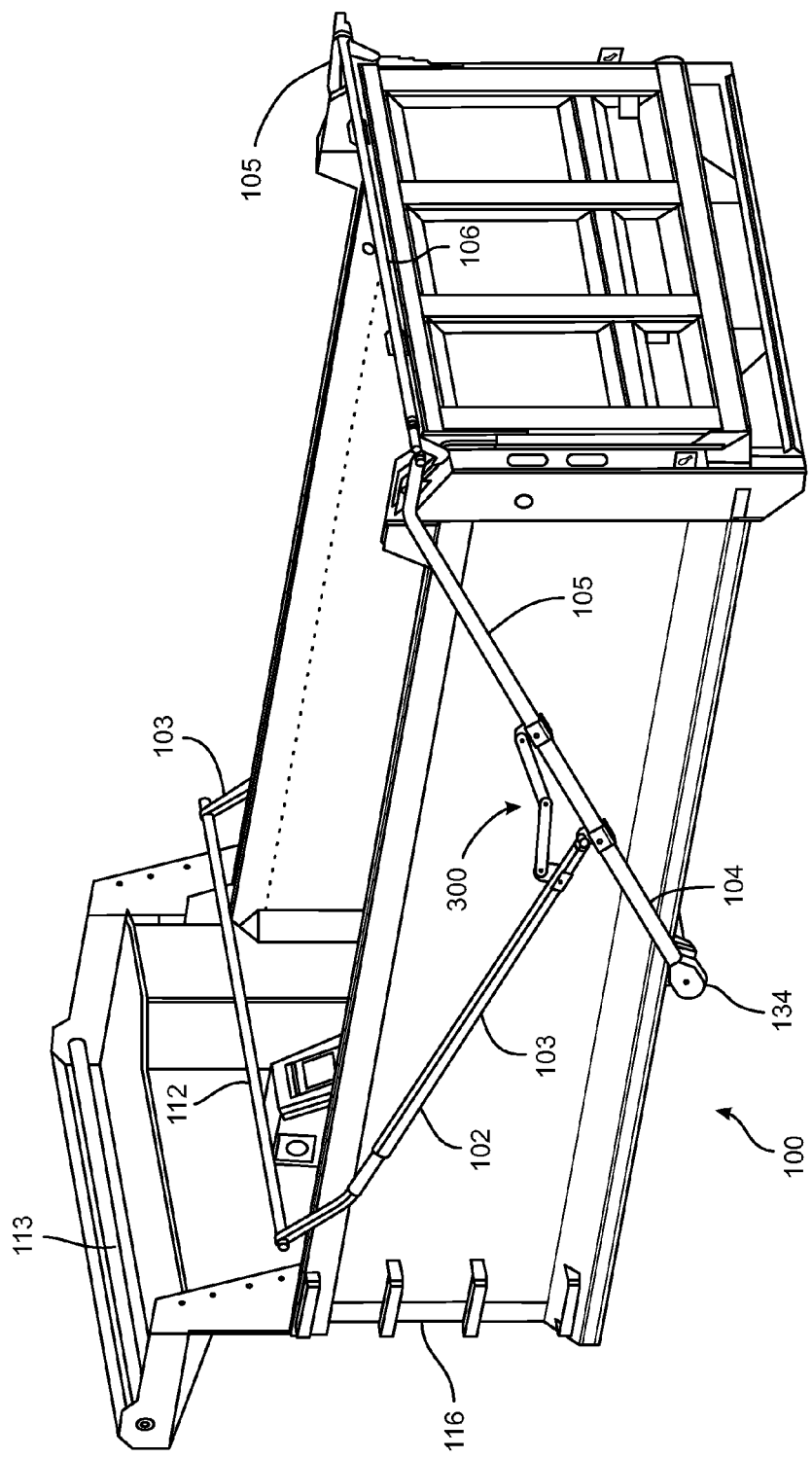
FIG. 5 is a perspective view of yet another hold-down portion of a flexible cover system for use with the hauling vehicle of FIG. 1, according to yet another embodiment of the present disclosure.

As shown in FIG. 2, in accordance with one embodiment of the present disclosure, a cover system, shown as a tarping system 100 for an open-topped container 120, includes a bail member, shown as a U-shaped tensioning bow member 102, and another U-shaped bail member 104. The bail member 104 includes two legs 105 (FIG. 5) and a horizontal mid-section 106 (FIG. 5). End portions of the legs 105 are connected to the bottom of the container 120 by a pair of torsion spring packs 134 (only one of which is illustrated in FIG. 2). The bail member 104 is formed from aluminum or another lightweight and rigid material.

The tensioning bow member 102 includes a pair of legs 103 (FIG. 5) and a horizontal mid-section 112. End portion of the legs 103 is connected to the legs 105 of the bail member 104 by another pair of torsion spring packs 108 (only one of which is illustrated in FIG. 2). Both the bow member 102 and the bail member 104 may be formed from aluminum or another suitable lightweight and rigid material.

A rear portion of a flexible cover, shown as a tarp 124, is connected to the horizontal mid-section 106 of the bail member 104. A front portion of the tarp 124 is connected to a roller 113 (FIG. 5) positioned near a front side 116 of the container 120. The horizontal mid-section 112 of the tensioning bow member 102 is separate from and positioned above the tarp 124 so that the mid-section 112 may bear against the tarp in use.

The spring packs 108 include a bracket member (referred to as a connecting plate 132), a housing 109, and a biasing spring (not shown). The connecting plate 132 connects the spring pack 108 to the leg 105 of the bail member 104. The other torsion spring pack 108 is connected to the opposite leg of the bail member 104 by another connecting plate (not shown). The housing 109 is connected to the leg 103 of the bail member 102 and is also pivotally connected to the connecting plate 132. The biasing spring is at least partially positioned within the housing 109.

The spring packs 108 are part of a hold-down assembly that is configured to bias the horizontal section 112 of the tensioning bow member 102 against the tarp 124 and an upper edge 128 of the container 120 (or a load carried by the container, if the load is positioned above the upper edge 128) to restrain movement the tensioning bow member 102. Accordingly, the horizontal section 112 is positioned against the tarp 124 by a force greater than just the weight of the bail member 102. The spring packs 108 exert a biasing force that is greater than the force exerted upon the tensioning bow member 102 by normal wind and/or gravity, among other effects. The spring packs 108 cause the tensioning bow member 102 to resist being pivoted toward a rear end of the container 120. The tarping system 100 having the spring packs 108 may positioned in a deployed position (see FIG. 1) and positioned in a retracted or stowed position without requiring user manipulation of the spring packs.

Figure 3:
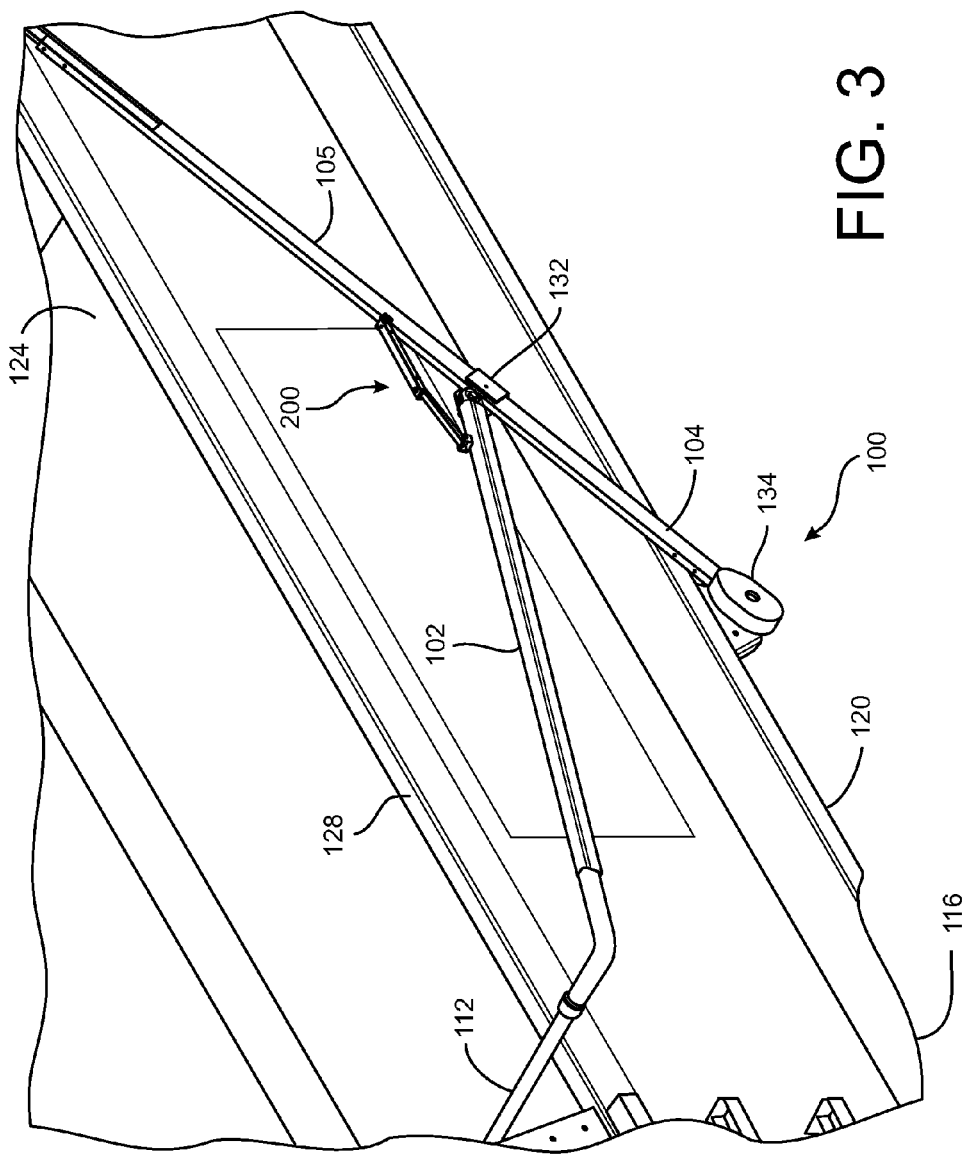
FIG. 3 is a perspective view of another hold-down portion of a flexible cover system for use with the hauling vehicle of FIG. 1, according to another embodiment of the present disclosure.
Figure 4:
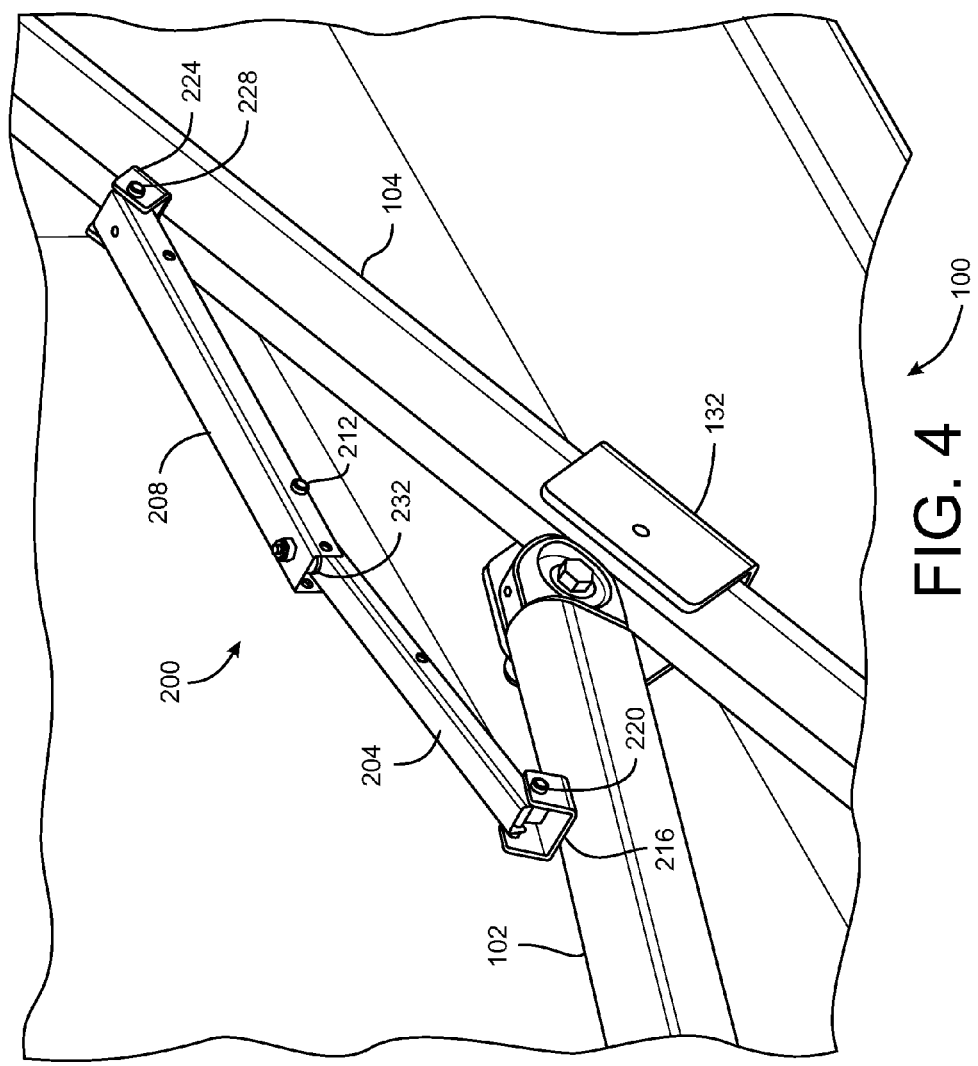
FIG. 4 is a close-up perspective view of the hold-down portion of the flexible cover system of FIG. 3.

The FIGS. 3 and 4 depict another embodiment of the tarping system 100, in which the hold-down assembly includes a locking mechanism 200 that maintains the tensioning bow member 102 in a fixed position relative to the bail member 104 when the tarping system is in the deployed position. The locking mechanism 200 includes a first linkage arm 204, which is pivotally connected to a second linkage arm 208 at a hinge 212. The hinge 212 includes a pin that extends through an end of the first linkage arm 204 and through a mid-region of the second linkage arm 208, such that a portion of the second linkage arm overlaps the first linkage arm. The first linkage arm 204 is pivotally connected to the tensioning bow member 102 with a pin 220 that extends through the first linkage arm 204 and a connection plate 216 of the tensioning bow member 102. The second linkage arm 208 is pivotally connected to the bail member 104 with a pin 228 that extends through the second linkage arm 208 and the connection plate 224 of the bail member 104. The linkage arms are configured so that they are substantially aligned in a predetermined position to lock the bail member and tensioning bow member, such as shown in FIG. 3.

The locking mechanism includes a locking element, which in the embodiment shown in FIGS. 3-4 includes a magnet 232 that is connected to the underside of the portion of the second linkage arm 208 that overlaps the first linkage arm 204. Alternatively, the magnet 232 may be fixedly connected to the upper side of the portion of the first linkage arm 204 near the hinge 212. The magnet 232 is configured to magnetically engage a magnetic portion of the first linkage arm 204, but only when the linkage arms are in the predetermined position. Another locking mechanism 200 is positioned on the opposite side of the container 120.

As shown in FIG. 4, when the tarping system 100 is in the deployed position, the magnet 232 becomes magnetically engaged to the magnetic portion of the first linkage arm 204 in the predetermined position such that the locking mechanism 200 restrains movement of the tensioning bow member 102. In particular, during deployment of the tarping system 100 the arms 204, 208 pivot about the hinge 212 from a collapsed orientation to the extended orientation shown in FIG. 4. Upon full deployment of the tarping system 100, the upper side of the first linkage arm 204 contacts and becomes magnetically engaged to the magnet 232, such that the arms 204, 208 are prevented from pivoting about the hinge 212. The arms 204, 208, when fixed in position by the magnet 232, prevent movement of the tensioning bow member 102 relative to the bail member 104. The magnet 232 remains affixed to the first linkage arm 204 in response to the force imparted upon the tensioning bow member 102 as a result of road shock, wind, and any other force generated in response or as a result of movement of the container 120.

The locking mechanism 200 enables retraction of the tarping system 100 without requiring user manipulation of the arms 204, 208. During retraction, movement of the bail member 104 causes a force to be exerted upon the hinge 212 that tends to separate the first linkage arm 204 from the magnet 232. Once the force exceeds the magnetic force, the first linkage arm 204 separates from the magnet 232, and the arms 204, 208 pivot to the collapsed orientation as the tarping system 100 is retracted. Additionally or alternatively, a cable mechanism may be connected to the arms 204, 208 to enable a user to separate the magnet 232 from the first linkage arm 204 before retracting the tarping system 100.

Figure 6:
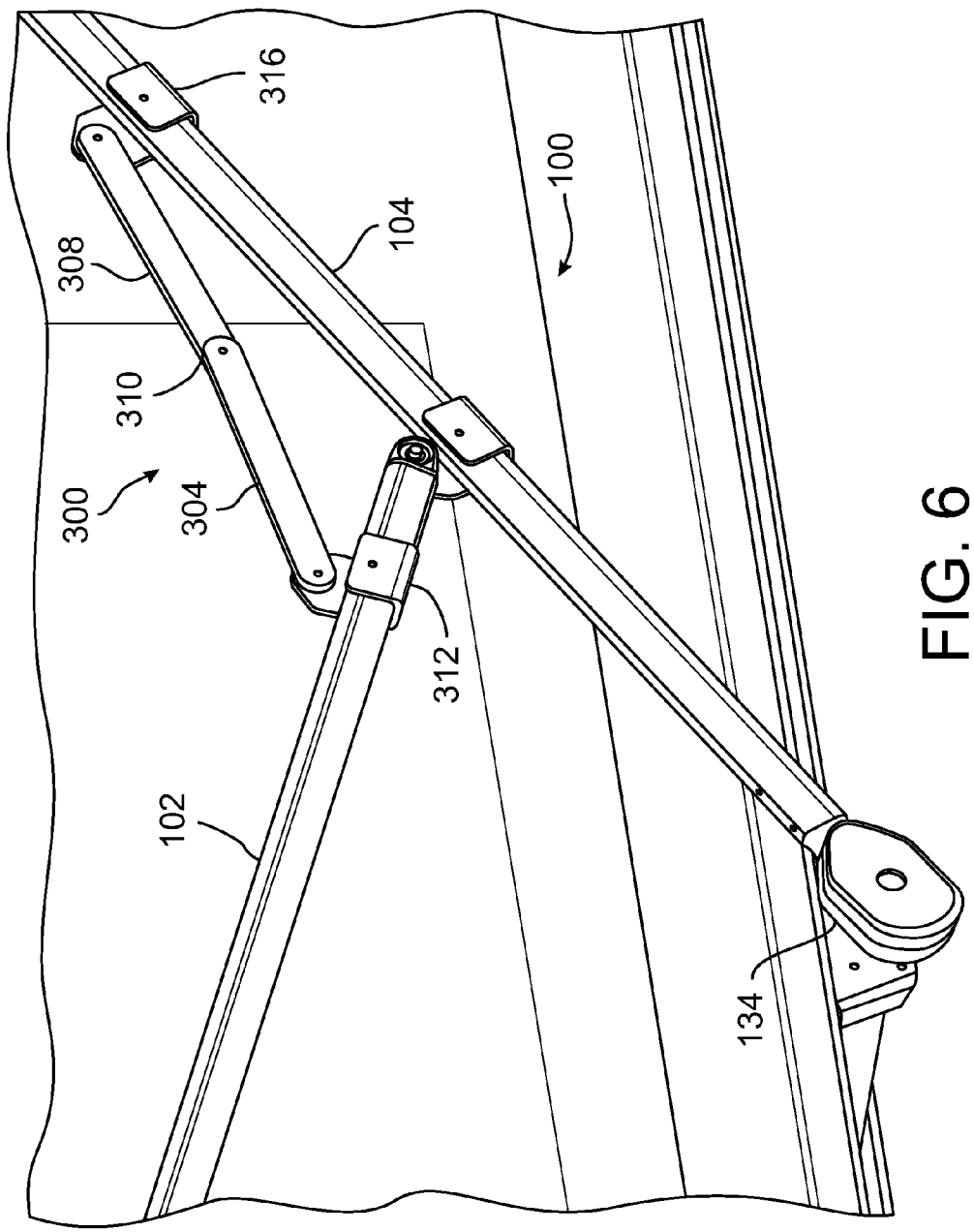
FIG. 6 is a close-up perspective view of the hold-down portion of the flexible cover system of FIG. 5.
Figure 7:
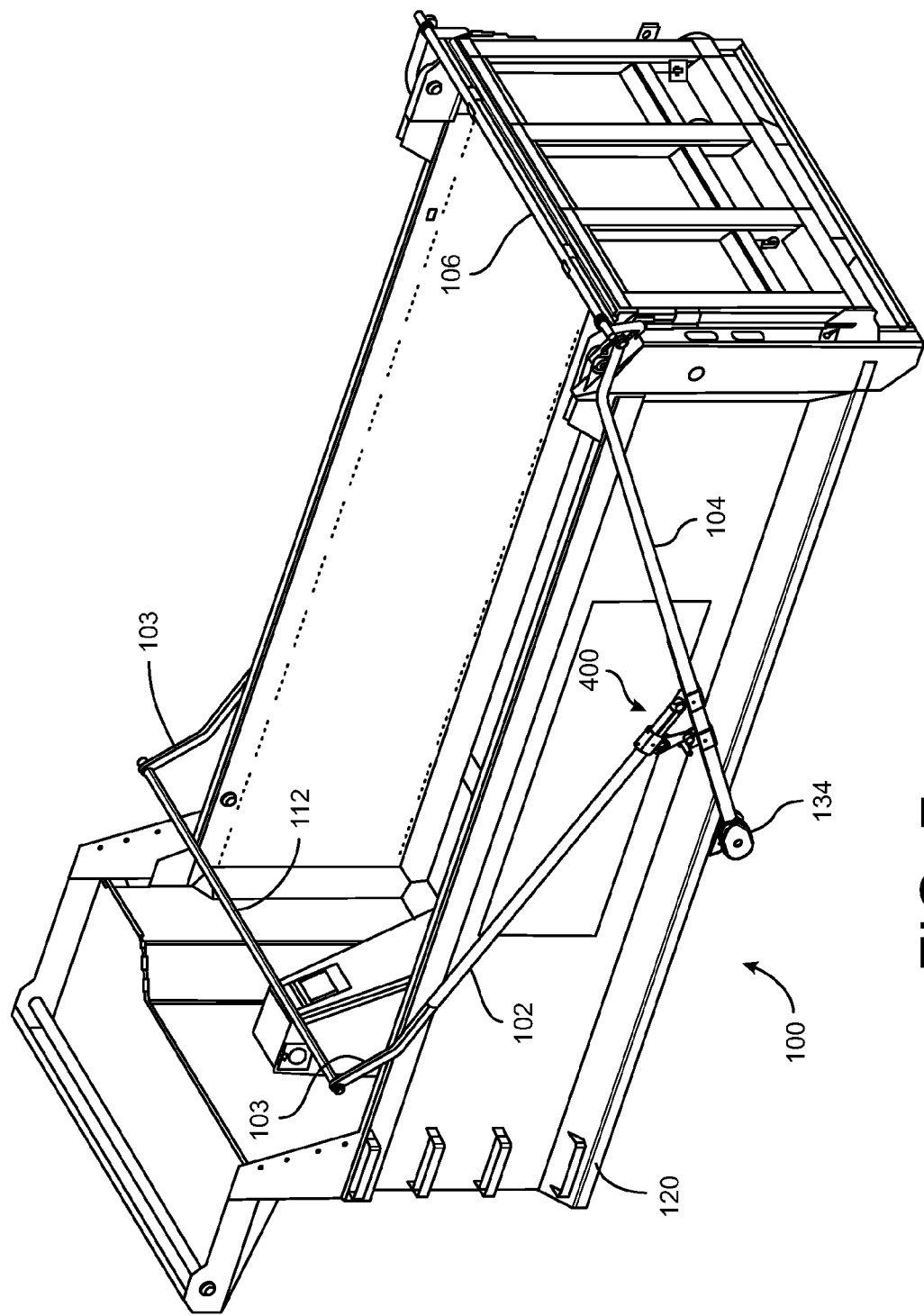
FIG. 7 is a perspective view of yet another hold-down portion of a flexible cover system for use with the hauling vehicle of FIG. 1, according to yet another embodiment of the present disclosure.

The FIGS. 5 and 6 illustrate the tarping system 100 having another embodiment of a locking mechanism 300. The locking mechanism 300 includes a linkage arm 304 that is pivotally connected to a linkage arm 308 at a hinge 310. The arm 304 is pivotally connected to the connection plate 312, which is fixedly connected to the tensioning bow member 102. Similarly, the arm 308 is pivotally connected to the connection plate 316, which is fixedly connected to the bail member 104. Another locking mechanism 300 is positioned on the other side the container 120, but is not illustrated. In one specific embodiment, the arms 304 and 308 are substantially flat plates.

In one embodiment, the locking mechanism 300 includes a locking element in the form of a friction engagement between the arm 304 and the arm 308 when the arms are in the predetermined position to restrain the tensioning bow member 102 against pivotal movement that might otherwise occur due to wind forces or road shock/vibration. In one embodiment, the hinge 310 may be configured to impart or maintain the friction engagement between the arms 304, 308 that resists movement of the arms about the hinge. The forces in the tensioning bow member 102 generated by vibrations and movement of the container 120 are less than the frictional force between the arms 304, 308.

Additionally or alternatively, the arm 304 and the arm 308 may include a positive locking apparatus to further restrain the tensioning bow member 102. An exemplary positive locking apparatus includes a detent and socket assembly. Once or more detents may be formed on one of the arm 304 and the arm 308, and one or more sockets may be formed on one of the arm 304 and the arm 308. Each detent is received by a respective socket when the tarping system 100 is fully in the deployed position. The detents remain seated in the sockets in response to the force imparted upon the tensioning bow member 102 as a result of road shock and movement of the container 120. The force imparted upon the tarping system 100 to retract the tarp, however, dislodges each detent from its respective socket to enable relative motion between the arm 304 and the arm 308. Additionally or alternatively, a biasing member may be coupled to the arm 304 and the arm 308 to limit movement between the arms 304, 308, thereby restraining the tensioning bow member 102 against the container 120.

Figure 8:
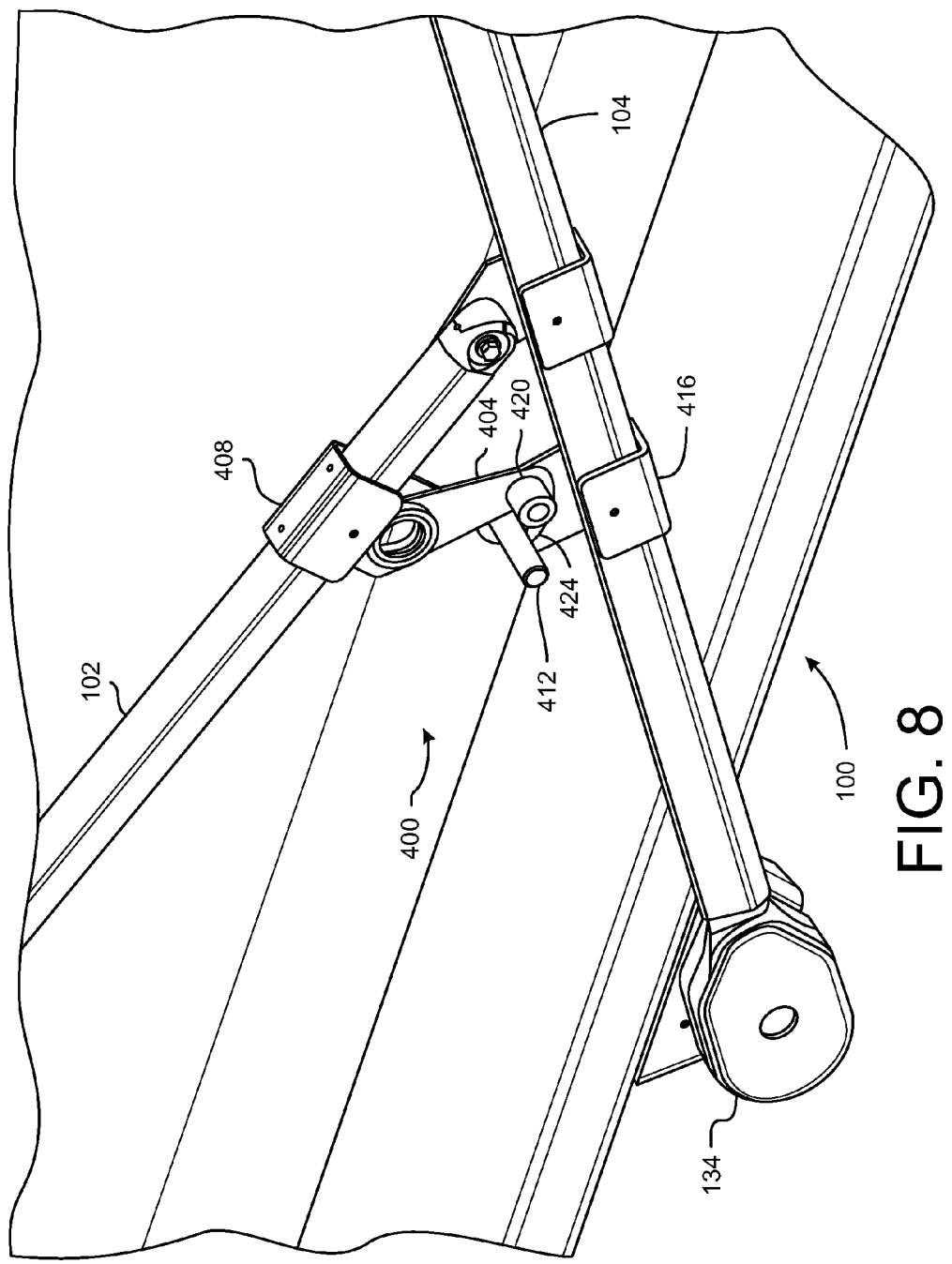
FIG. 8 is a close-up perspective view of the hold-down portion of the flexible cover system of FIG. 7.

In a further embodiment, shown in FIGS. 7-10, the tarping system 100 includes a locking mechanism 400 that restrains the tensioning bow member 102 when the tarping system is in the deployed position. Another locking mechanism 400 is positioned on the other side of the container 120, although is not illustrated. As shown in FIG. 8, the locking mechanism includes a hook 404 pivotally connected to a connecting plate 408, which is secured to the tensioning bow member 102. The hook 404 is configured to engage a post 412 extending laterally from a connecting plate 416 that is connected to the bail member 104. The hook 404 may include a weight 420, which causes the hook 404 to rotate into engagement with the post 412 as a result of the gravitational force exerted on the weight 420. Additionally or alternatively, a torsion spring may bias the hook 404 into engagement with the post 412.

The hook 404 engages the post 412 to restrain the tensioning bow member 102 when the tarping system 100 is in the deployed position, as shown in FIG. 8. As the horizontal section 106 of the bail member 104 approaches the upper edge of the container 120 during deployment of the tarping system 100, the curved bottom edge 424 of the hook 404 contacts and rides along the post 412, which causes the hook to rotate against the gravitational force exerted upon the weight 420. Continued movement of the bail member 104 toward the container 120 positions a tip of the hook 404 below the post 412 and enables one or more of the weight and the biasing member to rotate the hook, thereby seating the post in the hook, as shown in FIG. 8.

In one embodiment, the hook 404 can be configured to engage the post 412 when the hook is substantially vertical, as illustrated in FIG. 8. The hook 404, particularly edge 424, can be configured to allow the hook to disengage the post when the bail arm 104 is retracted. As the bail arm 104 is retracted the angle of the tensioning bow member 102 changes, which thus changes the angle of the hook 404 relative to the post 412. As the hook 404 continues to pivot, the curved edge 424 rides along the post 412 until it reaches a portion of the edge that permits dislodgement of the hook from the post.

Figure 9:
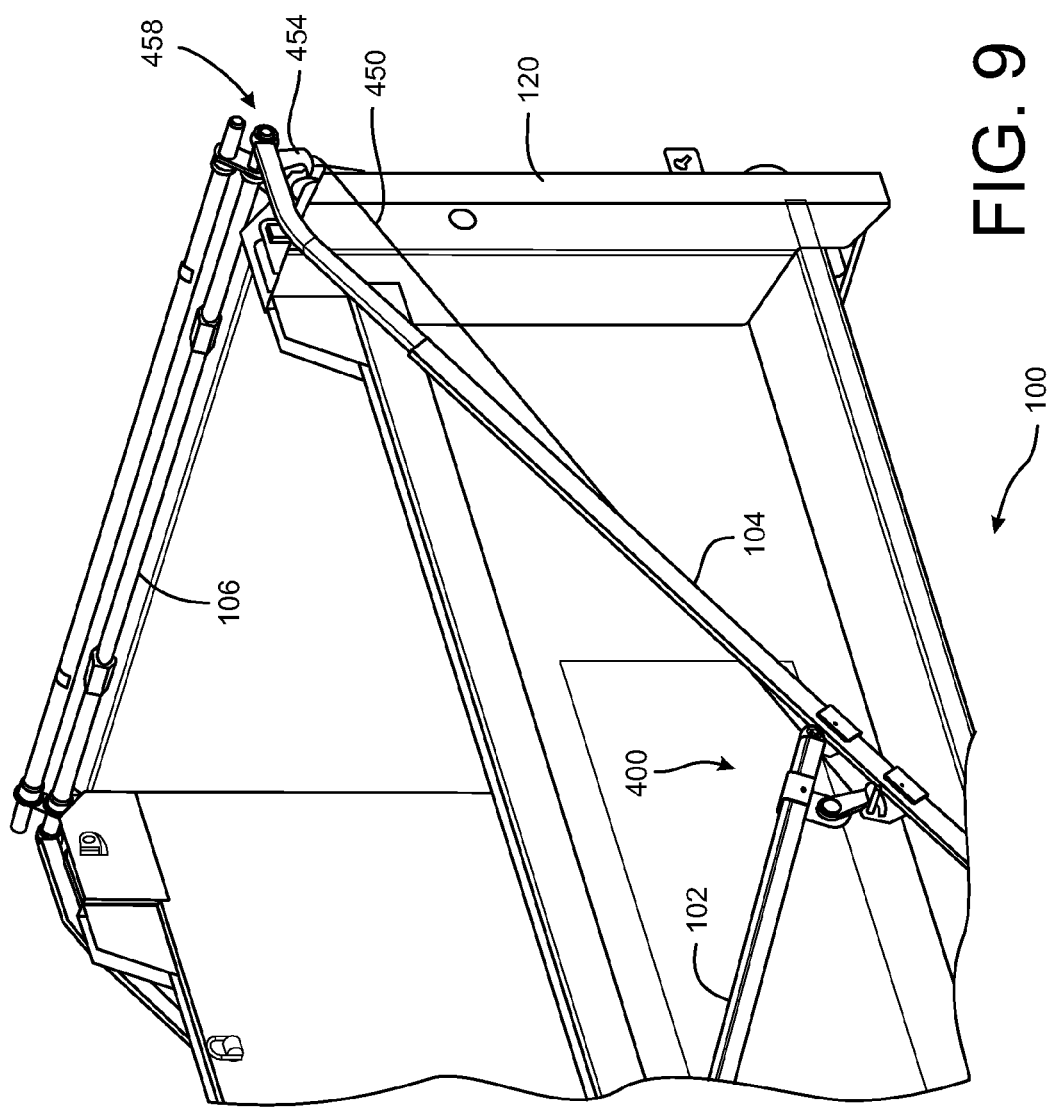
FIG. 9 is another perspective view of the hold-down portion of the flexible cover system of FIG. 7.

As shown in FIGS. 9 and 10, a release mechanism may be provided that includes a cable 450 connected to the hook 404 to disengage the locking mechanism 400 upon retraction of the tarping system 100. A first end of the cable 450 is connected to the hook 404, and a second end of the cable may be connected to a hook 454 of a locking mechanism 458, which is configured to restrain the bail member 104. Disengagement of the locking mechanism 458 draws the cable 450 and pivots the hook 404 away from the post 412. Alternatively, the cable 450 may be connected to a lever instead of the hook 454. The lever may be manipulated by a user to disengage the locking mechanism 400.

As shown in FIGS. 11 and 12, the tarping system 100 may incorporate another embodiment of a locking mechanism 500, which is configured to restrain the tensioning bow member 102. As shown in FIG. 11, the locking mechanism 500 includes a lock pin 504 and a ratchet arm 508. The lock pin 504 may be connected to the tensioning bow member 102, and the ratchet arm 508 may be pivotally connected to the bail member 104. A cable 512 may be provided that extends through a guide 514 and is connected to the ratchet arm 508. The cable 512 may wrap around the horizontal crossbar 106 (FIG. 9) of the bail member 104.

The ratchet arm 508 includes a plurality of teeth 516, each including a flat side 520 and an inclined side 524. The diameter or width of the lock pin 504 is less than the space between the teeth 516, such that the lock pin 504 fits in the space between the teeth. As shown in FIG. 12, the ratchet arm 508 rests against the lock pin 504, but is not connected to the lock pin. A similar locking mechanism 500 is connected to an opposite side of the tensioning bow member 102 and the bail member 104, but is not illustrated.

As the tarping system 100 is deployed, movement of the bail member 104 causes the ratchet arm 508 to move rightward, thereby drawing the inclined surfaces 524 of the teeth 516 against the lock pin 504. As the inclined surfaces 524 are drawn against the lock pin 504, the pivotable ratchet arm 508 pivots upward until the lock pin reaches the end of an inclined surface, which causes the ratchet arm to pivot downward and the lock pin becomes positioned between a leftward pair of the teeth. Once the tarping system 100 is fully deployed, the lock pin 504 remains positioned between a pair of the teeth 516. Forces imparted upon the tensioning bow member 102 as a result of, among other factors, road shock and movement of the container 120 cause the lock pin 504 to abut a flat surface 520 of one of the teeth 516. The ratchet arm 508 remains stationary in response to the lock pin 504 being forced against one of the flat surfaces 520, thereby restraining the tensioning bow member 102.

A release mechanism, which includes a cable 512 is tensioned to disengage the locking mechanism 500. The cable 512 is connected to the ratchet arm 508, such that tension on the cable causes the ratchet arm to pivot clockwise (FIG. 11). Once the ratchet arm 508 has been pivoted to a position in which the lock pin 504 is removed from between a pair of the teeth 516 the tensioning bow member 102 may be moved relative to the bail member 104.

As shown in FIGS. 13 and 14, the tarping system 100 includes a further embodiment of the locking mechanism 600 which restrains the tensioning bow member 102. The locking mechanism 600 includes a tube 604, pivotally connected to the tensioning bow member 102 at the pivot point 608, and another tube 612, pivotally connected to the bail member 104 at the pivot point 616. A hinge 618 pivotally connects the tube 604 to the tube 612. An extension spring 620 extends through the tubes 604, 612 and is connected to the bail member 104 near the pivot point 616 and to the tensioning bow member 102 near the pivot point 608. A release mechanism, which includes a cable 624 extends through a guide 628 and is connected to the tube 612. The cable 624 may wrap around the horizontal crossbar 106 (FIG. 9) of the bail member 104.

As shown in FIG. 13, when the tarping system 100 is deployed, the spring 620 is drawn under tension, which causes the tubes 604, 612 to pivot about the hinge 618 and the pivot points 608, 616 to a generally linear configuration. In this position, the locking mechanism 600 restrains the tensioning bow member 102 from movement which may occur as a result of road shock, container movement, and other factors. Specifically, forces exerted upon the tensioning bow member 102 are resisted by the hinge 618 and also by the abutment of the right end of the tube 604 against the left end of the tube 612.

To retract the tarping system 100 having the locking mechanism 600, the cable 624 is drawn taut in order to buckle the tube 604 and the tube 612 at the hinge 618, as shown in FIG. 14. The force exerted on the tubes 604, 612 by the cable is directed against the biasing force of the spring 620. Once the tubes 604, 612 have buckled the tensioning bow member 102 may move relative to the bail member 104.

Figure 15:
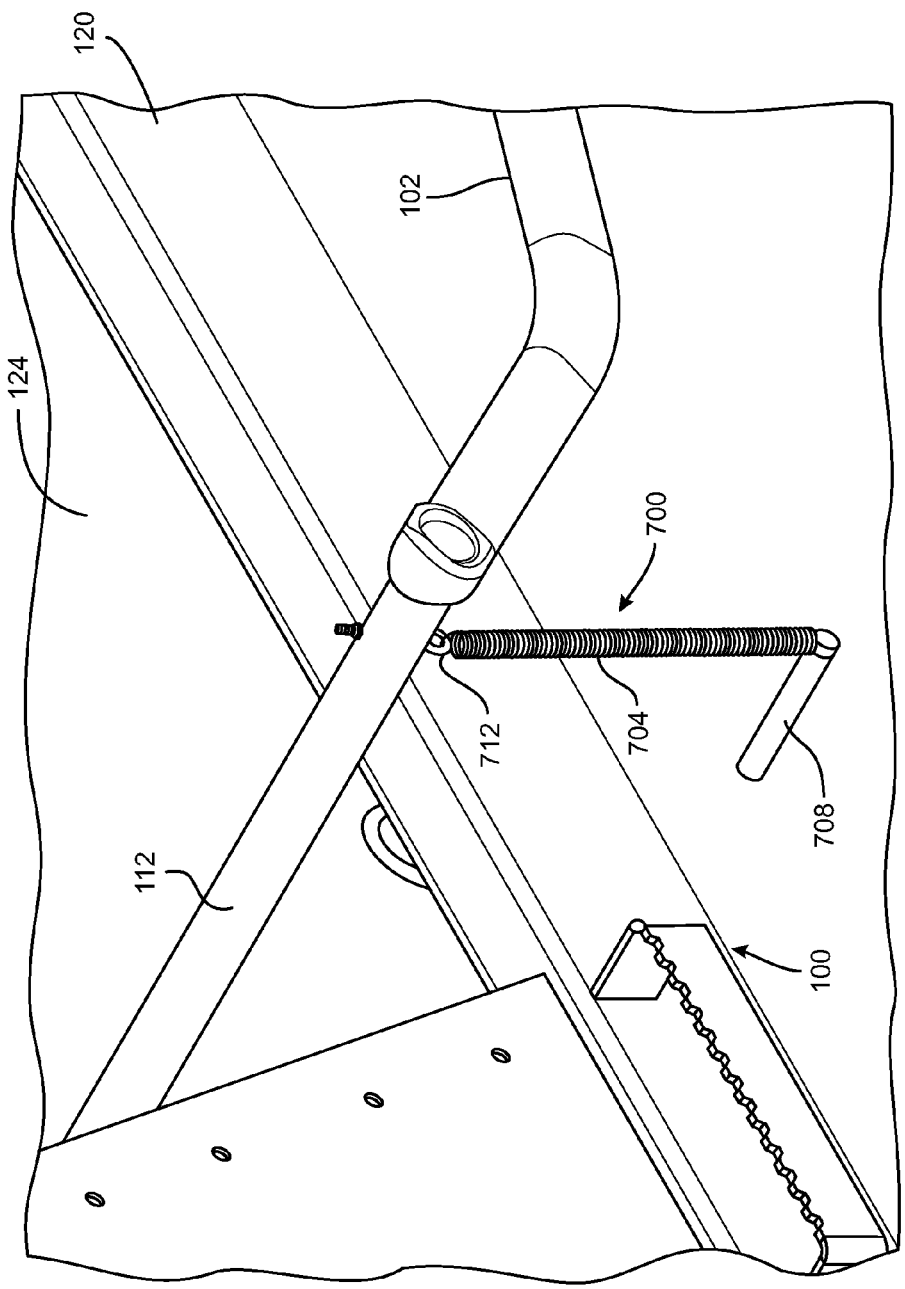
FIG. 15 is a perspective view of yet another hold-down portion of a flexible cover system for use with the hauling vehicle of FIG. 1, according to yet another embodiment of the present disclosure.

As shown in FIG. 15, the tarping system 100 includes another embodiment of the locking mechanism 700 which is configured to restrain the tensioning bow member 102. The locking mechanism 700 includes a biasing member 704 connected to the tensioning bow member 102 via an eyelet 712 and connected to the container 120 via a post 708 that extends from the container 120. The biasing member 704 illustrated in FIG. 15, and described herein, is an extension spring; however, the biasing member may also be a gas spring, bungee cord, or any other device configured to exert a tension force upon the post 708 and the horizontal section 112. Another locking mechanism 700 is positioned on the other side of the container 120 although it is not illustrated.

The spring 704 of the locking mechanism 700 draws the horizontal section 112 of the tensioning bow member 102 against the upper edge of the container 120 in order to restrain the tensioning bow member. Furthermore, the springs 704 dampen forces exerted upon the tensioning bow member 102 as a result of road shock, movement of the container 120, and other factors. The tarping system 100 including the locking mechanism 700 may be deployed and retracted without having to disengage or otherwise manipulate the locking mechanism 700.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A cover system for covering an open top of an open-topped container with a flexible cover, the flexible cover having one end connected to the container, and the flexible cover sized to substantially cover the open top when an opposite end of the flexible cover is moved to an extended position, the cover system comprising:
a bail member having a first end pivotally connected to the container and an opposite second end connected to the opposite end of the flexible cover, said bail member configured for pivoting from a stowed position to a deployed position in which the flexible cover is in the extended position;
a tensioning bow member including an end pivotally connected to the bail member and an opposite end configured for bearing against the flexible cover between the ends of the cover; and
a mechanism connected between said bail member and said tensioning bow member, said mechanism including a first linkage arm pivotally connected to the bail member and a second linkage arm pivotally connected at one end to the tensioning bow member and pivotally connected at an opposite end to the first linkage arm, said linkage arms pivotable relative to each other and relative to said bail member and tensioning bow to a substantially co-linear position when said bail member is in the deployed position to thereby lock said tensioning bow member against movement relative to said bail member, said mechanism further including a locking element disposed between said first and second linkage arm configured to lock said first and second linkage arms together only when said first and second linkage arms are substantially co-linear and further configured to automatically unlock upon movement of said bail member from the deployed position to the stowed position.

2. The cover system of claim 1 wherein the locking element includes:
a magnet connected one of said first and second linkage arms; and
a magnetic region on the other of said first and second linkage arms,
wherein said magnet and magnetic region are arranged for magnetic engagement only when said first and second linkage arms are in substantially co-linear.

3. The cover system of claim 2, wherein said magnet is configured to automatically disengage from the magnetic region upon movement of said bail member from the deployed position to the stowed position.

4. The cover system of claim 1, wherein:
the first member includes a first linkage arm pivotally connected to the bail member,
the second member includes a second linkage arm pivotally connected at one end to the tensioning bow member and pivotally connected at an opposite end to the first linkage arm; and
said mechanism includes a friction engagement between said first and second linkage arms and configured to lock said first and second linkage arms together only when said first and second linkage arms are in said predetermined position relative to each other to thereby lock said tensioning bow member against movement relative to the bail member.

5. The cover system of claim 4, wherein said first and second linkage arms are substantially flat plates.

6. The cover system of claim 1, wherein said opposite end of said tensioning bow member includes a bar sized to span the width of the flexible cover across the open top of the container.

7. The cover system of claim 1, wherein said bail member includes a torsion spring between said first end and the container, said torsion spring configured to bias said bail member to said deployed position.

* * * * *